(12) United States Patent
Kumeth

(10) Patent No.: US 6,609,042 B1
(45) Date of Patent: Aug. 19, 2003

(54) AUTOMATIC PRODUCTION AND ASSEMBLY MACHINE

(75) Inventor: Siegmund Kumeth, Amberg (DE)

(73) Assignee: Feintool International Holding, Lyss (CH)

( * ) Notice: Subject to any disclaimer, the term of this patent is extended or adjusted under 35 U.S.C. 154(b) by 0 days.

(21) Appl. No.: 09/337,505

(22) Filed: Jun. 22, 1999

(30) Foreign Application Priority Data

Jun. 24, 1998 (DE) .......................................... 198 27 983
May 22, 1999 (DE) .......................................... 199 23 735

(51) Int. Cl.⁷ .............................................. G06F 19/00
(52) U.S. Cl. ....................... 700/116; 700/169; 29/38 A; 29/338; 29/564
(58) Field of Search ...................... 700/58, 95, 112–116, 700/215, 221, 224–230, 169, 179; 29/38 A, 33 P, 564, 564.1, 711, 213

(56) References Cited

U.S. PATENT DOCUMENTS

| | | | | |
|---|---|---|---|---|
| 3,150,439 A | * | 9/1964 | Deberg | 29/38 C |
| 3,760,489 A | * | 9/1973 | Griffith | 483/9 |
| 4,309,600 A | * | 1/1982 | Perry et al. | 235/375 |
| 4,472,783 A | * | 9/1984 | Johnstone et al. | 700/182 |
| 4,533,823 A | * | 8/1985 | Vittorio | 235/375 |
| 4,549,270 A | * | 10/1985 | Fukumura et al. | 700/179 |
| 4,742,470 A | * | 5/1988 | Juengel | 700/175 |
| 4,824,310 A | * | 4/1989 | Kosmowski et al. | 414/222.06 |
| 5,202,940 A | * | 4/1993 | Betts | 385/24 |
| 5,231,585 A | * | 7/1993 | Kobayashi et al. | 700/96 |
| 5,787,002 A | * | 7/1998 | Iwamoto et al. | 700/115 |
| 5,815,902 A | * | 10/1998 | Osterried et al. | 29/38 A |
| 6,167,401 A | * | 12/2000 | Csipkes et al. | 707/10 |

* cited by examiner

Primary Examiner—Leo Picard
Assistant Examiner—Chad Rapp
(74) Attorney, Agent, or Firm—Hoffman, Wasson & Gitler, PC

(57) ABSTRACT

An automatic production and assembly machine focuses on the fact that each unit is provided with coding indicating at least the type of the specific function unit. The coding is transmitted via data transmission existing between the individual function unit and a central control unit. The coding makes possible continuous checking of the control program, such that certain program sequences for certain workstations are only executed when the coding of these workstations agrees with the respective program sequence. A number of other important functions are monitored, corrected and made to coincide with the central programming.

33 Claims, 6 Drawing Sheets

AUTOMATIC PRODUCTION AND ASSEMBLY MACHINE

BACKGROUND OF THE INVENTION

The invention relates to an automatic production and assembly machine.

Automatic production and assembly machines are known in the most varied forms. They are used for automatic production, and/or assembly, of components, or modules, composed of individual components which are supplied to work positions or to function units there, specifically to workstations. On the receivers which are moved past the workstations in a clocked manner these components are then assembled to the respective component, or the respective module in succession. The workstations can also be test stations.

For a simple design and production of these automatic production and assembly machines, to make them as efficient as possible, it is a good idea, at least for individual functions, which are required in the same or similar form in the assembly of components or modules of varied types, to provide standardized function units or workstations and standardized pertinent tools.

Furthermore, it is conventional and necessary for the individual function units to have sensors or interrogators, or to have actuators, for example pneumatic cylinders, and the pertinent electrical control valves, which then are monitored and/or controlled directly or indirectly by a central control and computer unit. This is a first central control program for the entire machine. This central control program must, among others, consider the type of function units used on the base unit, their position and arrangement.

The object of the present invention is to devise an automatic production and assembly machine which, in an especially simple and reliable manner, guarantees consideration of the function units used, i.e. workstations and/or tools in the control sequence.

SUMMARY OF THE INVENTION

The particularity of the invention resides in that each function unit is provided with coding which indicates at least the type of this function unit. This coding is transmitted via data transmission which exists between the individual function units and the central control unit. This yields a series of very advantageous possibilities, for example, automatic consideration of the control and monitoring functions which are necessary for the individual function units in the central control program, checking of the central control program for its conformity with the control and a test program which is necessary for the individual function units, etc.

The coding is delivered, for example, at one data output of the electronics of the respective function unit and is filed in these electronics, for example, in a chip or by corresponding contact-making, for example using contact bridges, etc. If the data are transmitted via a data link, which is formed by electrical conductors, for example, via a conductor bus, in the simplest case, the coding can also take place by corresponding assignment of contacts of a multiple plug, or a multiple socket, which is used to connect to the bus.

In one embodiment of the invention, the coding is done such that it also contains an indication of the position of the respective function unit on the base unit.

The approach as claimed in the invention makes possible continuous checking of the control program, such that certain program sequences for certain workstations, and/or tools, are only executed when the coding of these workstations, and/or tools, agrees with the respective program sequence.

For purposes of the invention, a "function unit" is defined as a unit with which the work necessary at a work position and/or functions are executed. The "base unit" is used for further transport of receivers from work position to work position. The base unit is, for example, one with a rotor which is rotary-driven around a vertical machine axis and on which there are receivers.

BRIEF DESCRIPTION OF THE DRAWINGS

The invention is detailed below using the following Figures.

DETAILED DESCRIPTION OF THE INVENTION

Figure 1:
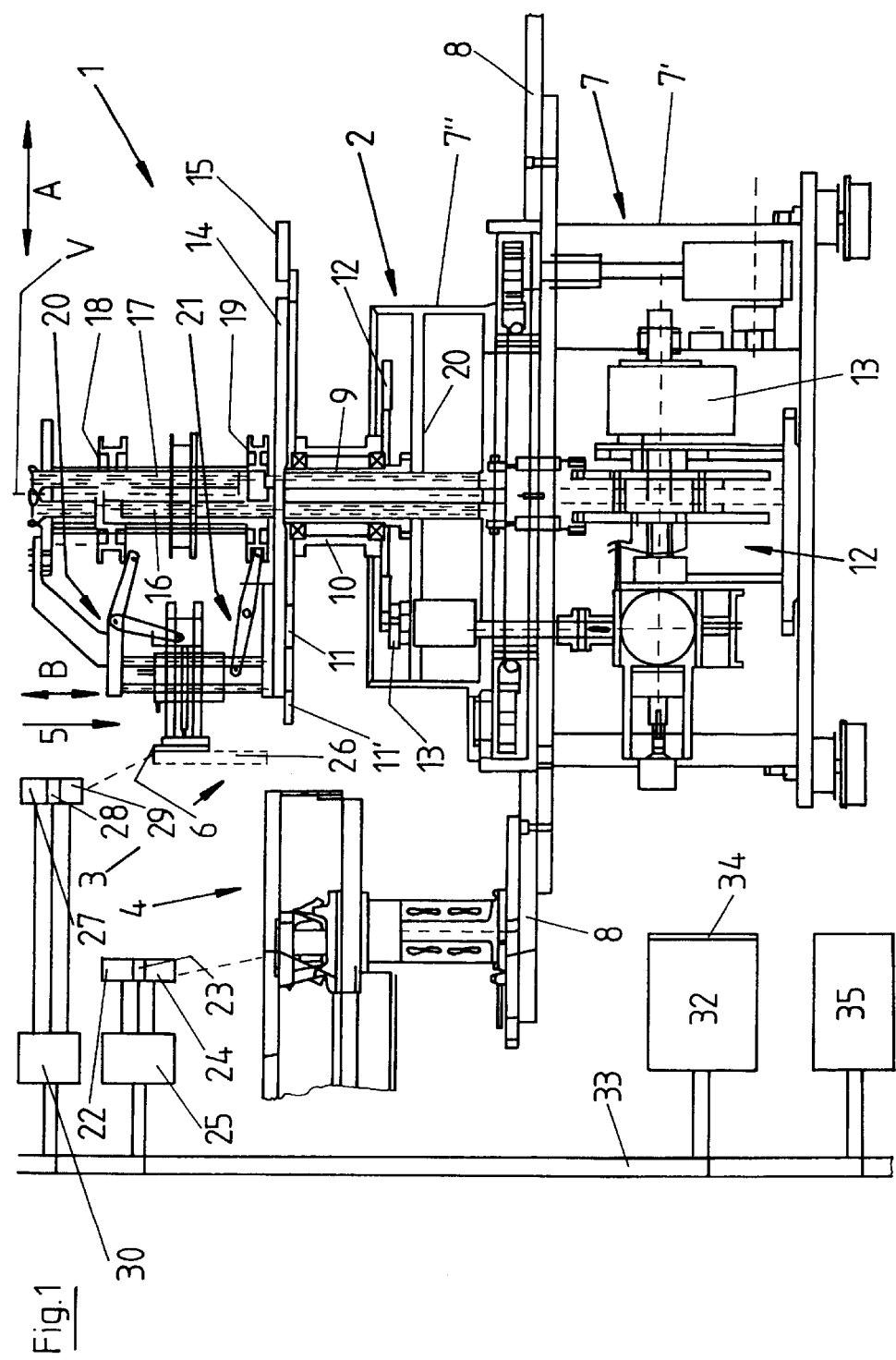
FIG. 1 shows, in a simplified representation, a vertical section through an automatic production machine as claimed in the invention.
Figure 2:
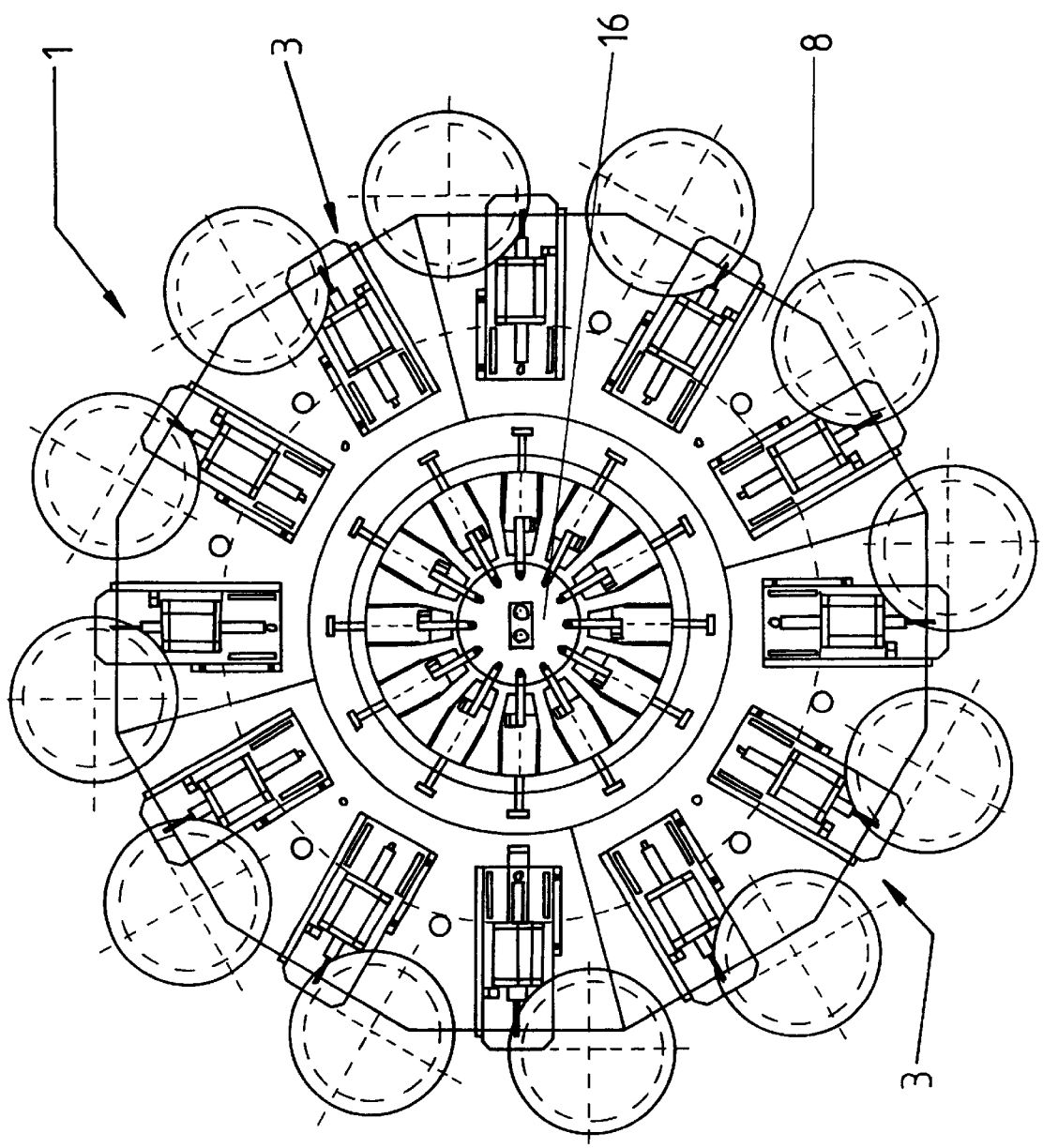
FIG. 2 shows in a simplified representation an overhead view of the automatic machines of FIG. 1.

The automatic production machine, which is shown in the figures and which is generally labelled 1 there, is used, for example, to produce or assemble components or modules from a plurality of individual parts, or components, which are supplied to the automatic production machine or its workstations 4. The automatic machine 1 is especially suited for assembly of small-format, mechanical, and/or electromechanical components, such as microswitches, etc.

The automatic production machine 1 contains a base unit 2 on which a plurality of work positions 3 are formed, distributed around a vertical middle or machine axis V. At each work position 3 there is, for example, at least one workstation 4. The workstations 4 are made very differently, and depend on the process steps executed at the respective work position 3, and the supplied and/or processed components, etc. Some stations 4 are used to supply components to the respective work position 3 and to prepare them at this work position in a stipulated position and/or orientation, previously for example, the components were checked individually, the presence of components and/or their correct orientation and position being checked, etc. Some work positions 3 are for measurement and testing, the workstations 4 there act as measurement or test stations.

In the embodiment shown in the figures, a lifting means 5, with a tool carrier 6, is assigned to the work positions 3. The tool carrier 6 synchronously with the drive, or the working stroke of the base unit 2, can execute a horizontal stroke (double arrow A) and/or a vertical stroke (double arrow B). On the tool carrier 6, there can be provided a variety of tools 26, for example grippers, feeders, measurement contacts, riveting or punching tools, etc. which then interact with the station 4, which is also provided at the respective work position 3, for performing the work there. In some work positions 3, the lifting means 5 can be omitted.

The base unit 2 has a machine frame or a housing 7, in which there is the mechanical drive of the base unit and on which, in the embodiment shown on the outside an annular table 8, is attached which projects in the manner of a polygon on the periphery, which is formed by a plurality of segments, and which is used for attachment of the workstations 4. The table 8 is provided on a bottom segment 7' of the machine frame 7.

The machine frame 7 has a segment 7", on which a vertical column 9 which concentrically surrounds the axis V is attached to the top with its bottom end which projects over the top of the segment 7". On the column 9, a hollow shaft 10 is pivotally mounted which with its top end is attached to a rotor or a rotary table element 11. The bottom end of the hollow shaft 10 is connected to the drive 12 which causes clocked rotary motion of the table 11 around the axis V via a Geneva drive which is driven by the electric motor 13. Above the table element 11, a table element 14 is attached to the column 9 which does not turn at the same time and like the table element 11 is made in the shape of a circular disk and with its axis is coaxial with the axis V. The table element 11 projects with a peripheral area 11' over the edge of the table element 14. Receivers 15 are attached to the peripheral area 11' and are used for holding a module or a component and have on their top a corresponding "nest" in which the modules, which are assembled increasingly to the desired product, are located in a central control unit in an exactly stipulated orientation and positioning. In each working stroke of the drive which has at least one motion step and a subsequent down time, the receivers 15 continue to move by one machine division around the axis V. The work positions 3 are located around the axis V corresponding to this machine division.

For the movements of the lifting means 5, which are located on the table element 14, which does not turn, there are lifting rods 16 and 17 which are actuated by the drive 12 and which have one control disk 18 and 19, each which is common to all means 5. Lever arrangements 20 and 21 of the lifting means 5 interact with these disks in order to execute the respective movements synchronously with the movement of the lifting rods 16 and 17 and thus synchronously with the drive 12.

As was already mentioned above, the work stations 4 are made differently according to the working process at the respective work position 3, and are made with a variety of sensors 22, actuators 23 (for example, pneumatic cylinders) or other electrical or mechanical drives, or control elements 24, for example, control valves. Furthermore, in the embodiment shown, each workstation 4 has microprocessor-supported electronics 25 which interact with the aforementioned sensors, actuators, control valves etc. and receive their signals and/or trigger these elements.

In general, one of the tools attached to one of the carriers 6 of the lifting means 5 is labelled 26, in FIG. 1. This tool 26 has interrogators or sensors 27 which monitor the position and/or the state of the tool 26 (for example, opened and/or closed state of tongs), and/or actuators 28 for actuating the tool 26 or parts of this tool (for example, for opening and closing grippers or tongs) and/or control valves 29, for example for opening and closing of vacuum channel which leads to a nozzle or of a channel for blowing air, etc. Also, for example, microprocessor-supported electronics 30 are assigned to the tool 26 and interact with the elements 27–29 of the tool 26. Since the elements 22–24 and 27–29 with respect to their number and/or arrangement on the workstation 4, or on the tool 26, depending on function can be very different, in FIG. 1 these elements are given as a block which is referenced to the workstation 4 or the tool 26 with the broken line. In fact these elements and the pertinent electronics 25 and 30 are a permanent component of the respective workstation or the respective tool 26.

Since in the manufacture of different types of products, the same or very similar working steps are necessary, not only is the base unit 2 of the automatic production machine 1 standardized, but at least in part, the workstations 4 and the pertinent tools 26 are standardized. Fully serviceable modules, which are matched to the respective function, and which are assembled according to the production process, or the process sequence, at the pertinent work positions 3, for example, with the pertinent tool 26 on the pertinent lifting means 5. These standardized workstations 4 are stations for feed and/or separation and/or insertion and assembly of springs and/or contacts and/or housing parts, electrical and/or mechanical test and measurement stations, stations for producing screw and rivet connections, etc.

A central, microprocessor- or computer-supported control unit labelled 32 is used for central monitoring and/or control of all workstations 4, and the pertinent tools 26, and is connected, for this purpose, via data links 33 to the workstations 4 and tools 26, or to their electronics 25 and 30, for example, via an electrical bus system which has several electrical leads, or via a fiber optic bus.

The central control unit 32 contains the program for monitoring and/or control of the individual workstations 4, and the pertinent tools 26, for each type of workstations 4 or tools 26 there being one separate component program or subroutine 34 at a time.

Each workstation 4 and each tool 26 in the present machine configuration, i.e. in the selected arrangement of the workstations 4 on the base machine or base unit 2, has coding which has among others at least one multiplace station code or equipment identification IG, which determines the type of workstation or tool 26. This equipment identification IG is permanently filed in the electronics 25 and 30 of the pertinent workstation 4, or the tool 6. In addition, these workstations 4, or tools 26, which do not correspond to one standard type, i.e. which represent a special fabrication for the special task, have an equipment identification IG which is permanently filed in the electronics 25 or 30 and which identifies, or fixes, the workstation 4, or the tool 26, of one such unstandardized type.

The coding contains other information, for example, also changing identifications, such as, for example, location coding or location identification IP, which indicates the position of the respective workstation 4 on the base unit 2, i.e. the respective work position 3, at which there is the pertinent workstation 4. For identification IP, for example, on the machine frame 7 and/or on the tool carriers 6 there is coding which is acquired and/or scanned with a corresponding coding means of the electronics 25 or 30.

The codings of the workstations 4, and the tools 26, are transferred to the central control unit 32 via the data link 33. Based on these codings, checking of the actual machine configuration with a desired configuration, programming of the central unit is possible. Furthermore, codings of the workstations 4, and tools 26, can be for simplified programming of the central control unit 32, by retrieving standard subroutines 34 which have already been filed for the respective type of a standardized workstation 14, or a standardized tool 26, or are available on a data medium, etc. Furthermore, the control program of the machines 1, or the individual workstations, can be checked and/or monitored with the codings transferred to the central control unit 32.

Since in the described embodiment, some functions of the machine, specifically continuing to move the rotary table 11 and the receivers 15 there, movements of the tool carrier 6 on the lifting means 5 take place permanently forced by the drive 12, the sequence of the control and monitoring program of the central control unit 32, for the individual workstations 4, and the pertinent tools 26, is synchronized with the drive of the automatic machine 1.

Figure 3:
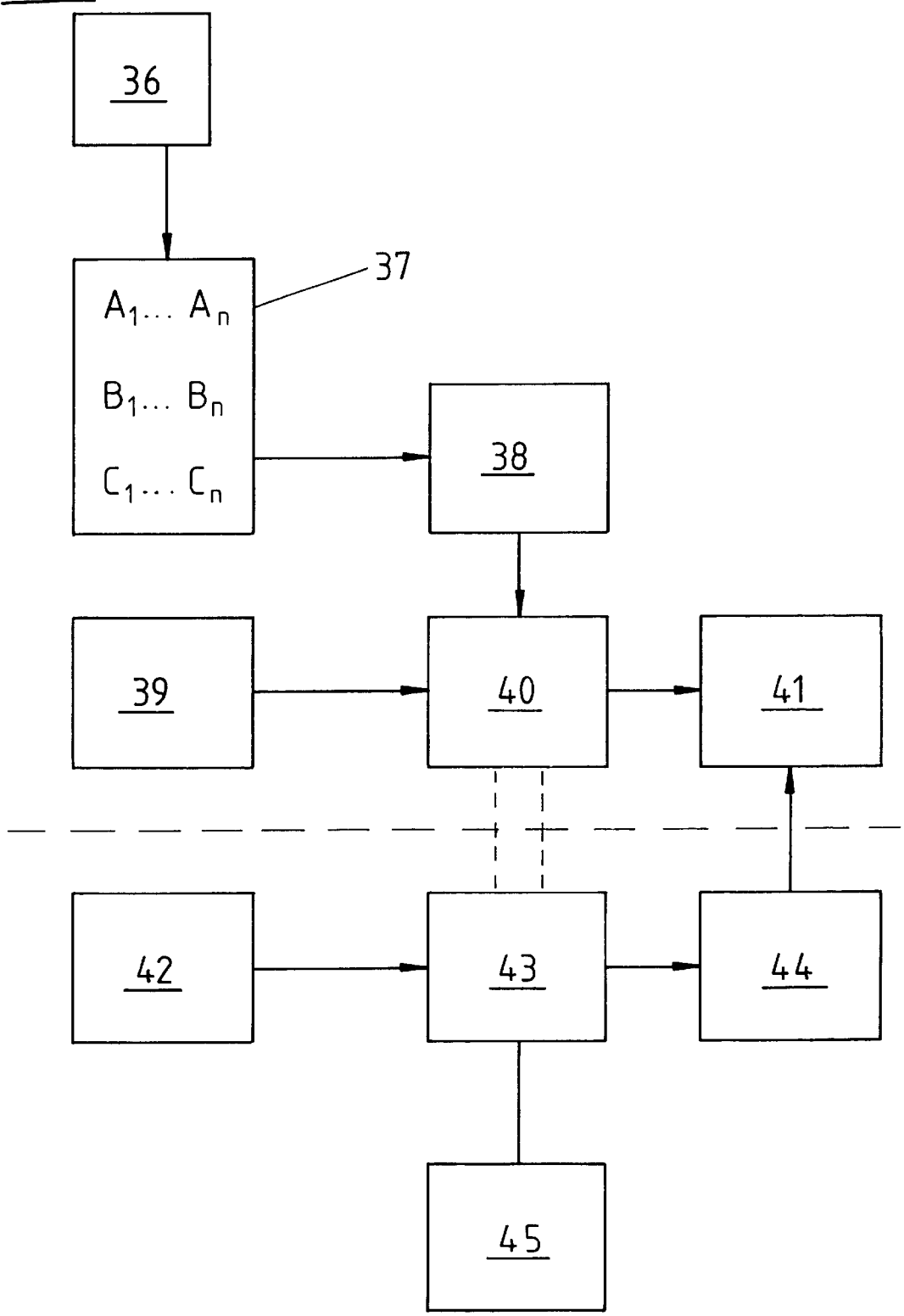
FIG. 3 shows a simplified diagram of the process sequence in the machine configuration.

Design of the control of the workstations 4, or the function elements of these workstations, is described in general above. FIG. 3 shows in a simplified representation and as a diagram the procedure in the configuration and programming of a base unit, or a base machine 2, with the workstations or function elements 4 necessary for manufacturing a certain product. The machine configuration and the programming of the control unit 32 which follows from the configuration takes place using a special computer 35 which is connected during configuration via a data line to the control unit 32. Of course, it is also possible for the control unit 32 itself to be made as a computer for producing the desired configuration and the machine program.

According to the diagram reproduced in FIG. 3, a desired machine configuration (block 40) is prepared proceeding from the product 36 to be manufactured, first with consideration of the function elements present in a type administration 37, with establishment of the time sequence of the working steps necessary for manufacturing the product 36 (block 38) and with establishment of the positions of the individual function units, or the workstations, formed by them on the base unit 2 (block 39). In FIG. 3, the individual types of function units are labelled $A_1 \ldots A_n$, $B_1 \ldots B_n$, and $C_1 \ldots C_n$, the function elements A being those of one such first group with simplified function, and control, and the function elements B and C being those of one such second group which have more complex operation, and triggering, and thus which require a more complex control program. With consideration of the desired configuration, the control program for the machine is then prepared (block 41). Here for the most part subroutines filed in the configuration and programming unit 35 for the individual function elements $A_1 \ldots A_n$, $B_1 \ldots B_n$, and $C_1 \ldots C_n$ can be used, from which then the unit 35 at least for the most part prepares the overall control program independently.

If the number of work positions on the base machine is larger than the number necessary for manufacture of the product 36, it is possible to set up on the same base machine 2 another process line for manufacture of the same product 36 or another product 36 by configuration of the work positions which are not needed in the first process line, then the overall control program of the machine 1 is prepared from the individual desired configurations.

The different types A, B, and C for the function units, the pertinent programs, etc. are filed as a database in the configuration and programming unit.

Based on the desired configuration, the individual workstations 4 are then built up from the function elements A, B, and C which have been established in the desired configuration on the individual work positions 3 of the base machine 2, which have been established likewise in the desired configuration. This actual configuration (block 42) is then compared after its completion with the desired configuration (block 43). This comparison is done automatically by the configuration and programming unit 35 and is possible by the configuration and programming unit 35 which is connected to the control unit 32 having accurate information available about the actual configuration via the equipment identification IG, and the pertinent location identification IP, especially about which work positions 3 are in fact occupied by function elements and which function element is located on which work position.

If checking yields agreement of the actual configuration and the desired configuration, this is confirmed and the control program 41 is released for a trial run of the machine (block 44). If no agreement is ascertained between the desired configuration and the actual configuration, this is displayed and requested for checking of the actual and/or desired configuration (block 45).

The function units are transfer or re-positioning elements with pick- and place-function or simple measurement probes or monitoring sensors, etc. The function elements B and C are more complex feeds of components, such as springs, connecting elements, contacts, housing parts, etc. or function elements for executing special processing or machining sets, measurement means, etc.

Figure 4:
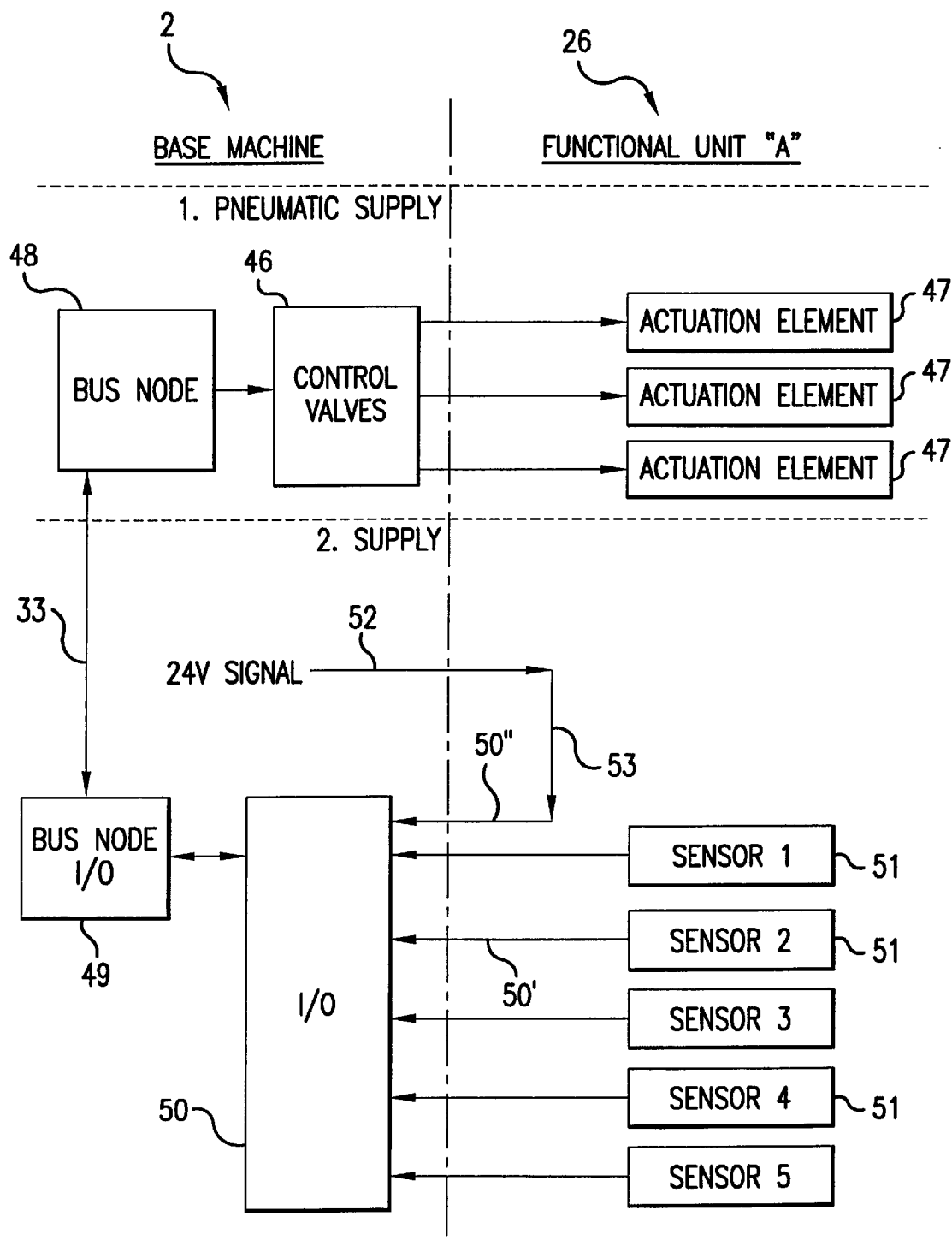
FIGS. 4 and 5 each show the connection diagram of the base machine with a first group of function units of workstations and a second group of function units of workstations, and FIGS. 6 and 7 each show in an overhead view the supply connector or the mating supply connector for connection of a function unit, especially a function unit of the second group.

FIG. 4 shows the connection of the base machine with the function units of group A, with respect to the signal and power supply, for the sake of simplification only one of the function units A is shown.

The function units of group A, in the embodiment shown, are those which are provided on the movable tool carriers 6 of the base machine 2. The function elements of group B and C are those which are located in a distributed manner on the table 8 of the base unit 2 and around the peripheral table element 11. The individual workstations are then formed, at least in part, by at least one function element of group A and one function element of group B and C.

As has already been detailed above, data transmission and triggering of the individual function elements take place via the data bus 33 which is shown again in FIG. 4. For all function elements A, or for one certain number of these function elements at a time, combined on the base machine into a block, there are control elements 46 for triggering the actuation elements 47 of these function units A. In the embodiment shown in FIG. 4, the control elements are valves and the actuation elements 47 are pneumatic cylinders actuated via these valves. For the control elements 46 on the base machine 2, there is furthermore one bus node 48 which depending on the commands transmitted via the bus 33 controls the control means 46 for actuating the respective actuation element 47.

Analogously to triggering the actuation element 47, for all function units A, or for one group of function units at a time, there is a common bus node 49 which is connected to at least one input and output electronics, or input and output unit 50, which is provided on the base machine 2 and to which the sensors 51 of each function unit A are connected. The unit 50 for the sensors 51 of all function units A has inputs 50'. Furthermore, the unit 50 for each function unit A has one input 50' on which then there is a DC voltage signal when a function unit A is connected or "plugged" to the corresponding work position 3, i.e. a line 52 of the base machine 2 which carries the DC voltage is connected via the bridge 53 which is present in each function unit A to the terminal 50".

The connection of each function unit A to the base machine 2 takes place via a connector which is provided on the function unit A and a corresponding mating connector which is provided on the base machine 2 at each work position 3, in the connector of the respective function unit A there also being is the bridge 53. The connector and the mating connector are made such that this plug connection is common to the entire signal and power supply.

Figure 5:
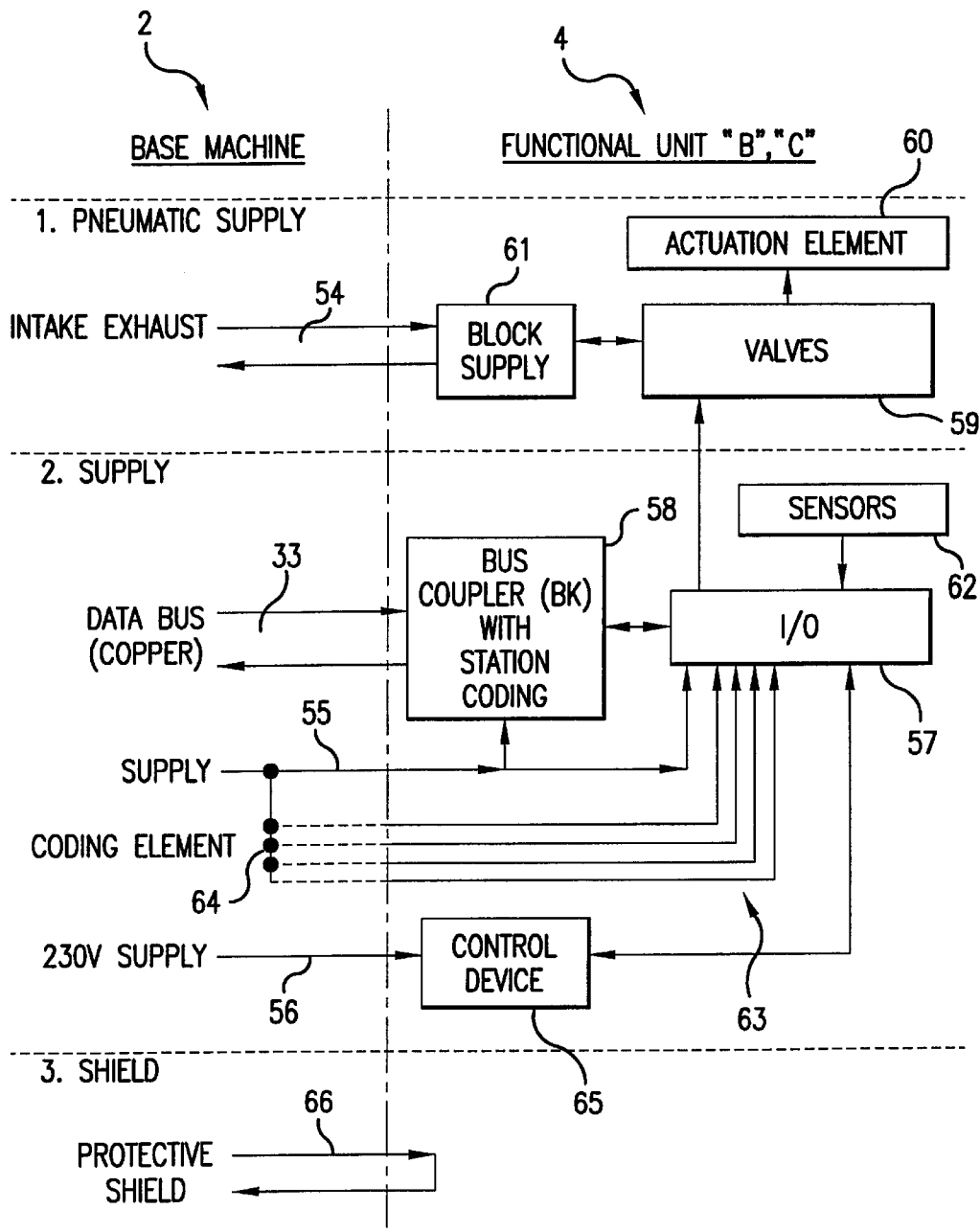

FIG. 5 shows in a similar representation to FIG. 4, the diagram of the connection of the function units B and C to the base machine 2, for the sake of simplification, only the connection of one such function unit to the base machine is shown.

In FIG. 5, the data and control bus is labelled 33. Furthermore, in FIG. 5, the pneumatic supply, which is provided on the base machine 2, is labelled 54, i.e. in the embodiment shown one line for incoming air and one line for outgoing air. The electrical low voltage supply labelled 55 supplies electronic circuits or the respective function unit B/C. Furthermore a line voltage supply on the base unit for function units B and C is labelled 56.

As is shown in FIG. 5, each function unit B/C has its own electronics 57 and its own bus coupler 58 via which the electronics 57 interacts with the data and control bus 33. The electronics 57 trigger the valves 59 which are provided separately for each function unit P/C for actuating the actuation elements or cylinders 60. The valves 59 are connected via a block supply 61 to the pneumatic supply 54.

Figure 6:
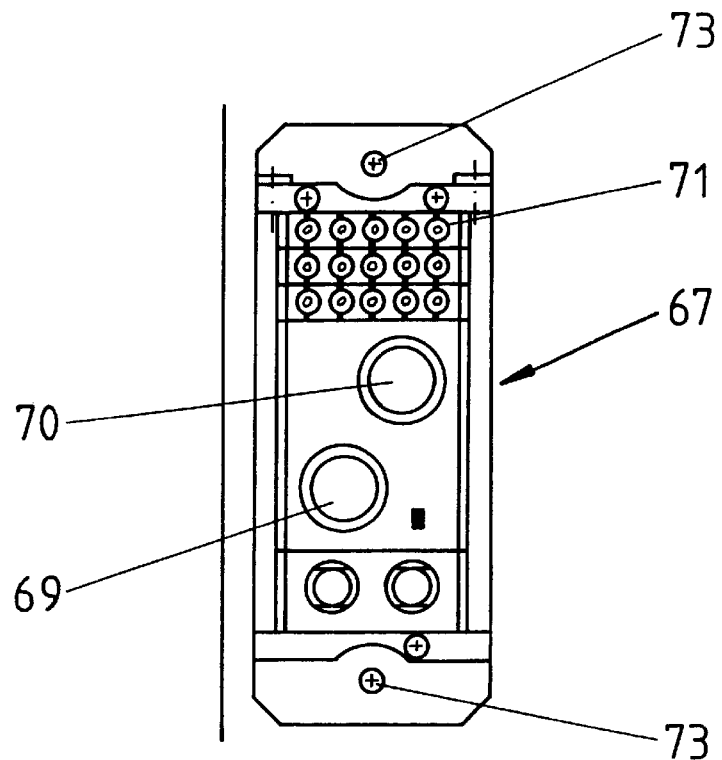
Figure 7:
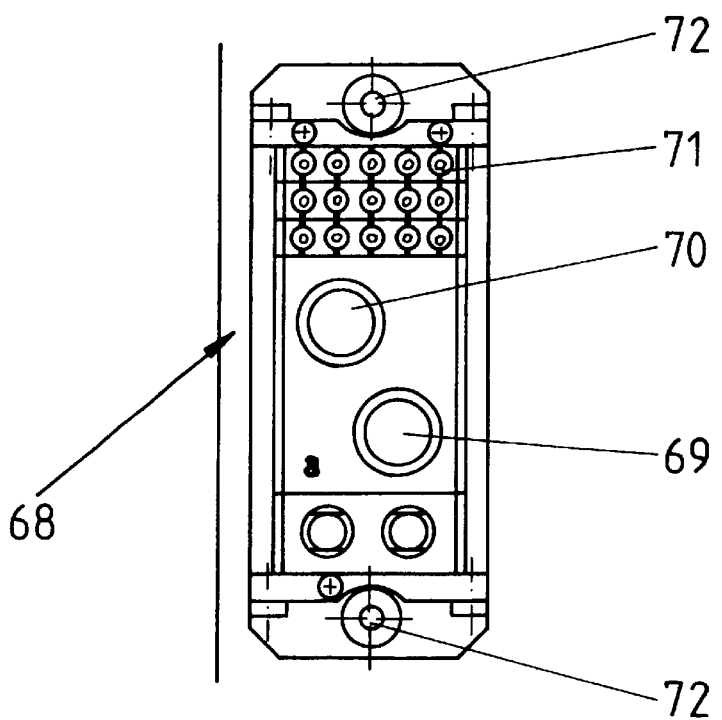

Furthermore, sensors 62 of the respective function unit B/C are connected to the electronics 57. Furthermore, the electronics 57 have inputs 63 on which for the function unit B/C mounted on the base machine 2 there is a signal which corresponds to the location identification IP of the respective work position 3 on which the function unit is mounted. The signal on the inputs 63 is generated by a local coding unit 64 which is formed by corresponding wiring and which is provided on the respective work position 3. In the embodiment shown the function unit B/C has another control device 65 which, controlled by the electronics 57, controls electrical function elements which are not shown. Furthermore, the function unit B/C is connected to a protective circuit 56 (protective ground) of the base machine 2. The entire signal and power connection between the base unit and the function unit B/C takes place via a common connector which is provided on the respective function unit and a mating connector which is provided on the respective work position preferably such that when the respective function unit is positioned on one work position in addition to mechanical alignment and fixing of the function unit the connection between the connector and mating connector also takes place. FIG. 6 shows one such mating connector 67 which is provided at each work position 3. FIG. 7 shows the connector which fits for this purpose and which is provided on each function element B/C.

Depending on the control signals transmitted via the bus 33 the cylinders 60 and the control devices 56 are triggered via the bus coupler 58 and the electronics 57. Furthermore, the signals of the sensors 62 are transmitted via the bus coupler 58. From the equipment identification IG, which is filed in the electronics 57, and which defines the type of function unit B/C, and from the location identification IP, which is derived from the coding means 64, and which is present at the input 63, the electronics 57 form the overall coding which is transmitted on request via the bus coupler 58 and the data and control bus 33 to the control unit 32.

As FIG. 5 furthermore shows, the control and data bus is looped through by the bus couplers 58 of the individual function units B/C. This yields an especially simple design of this bus, in the form of a fiber optic bus. At work positions 3, where there is no function unit B/C, an empty unit is positioned which has only the electronics 57 with the inputs which interact with the coding means 64 and the bus coupler 58, and delivers the corresponding identifications IP and IG.

Via the connector 68, and the mating connector 67, the connection of all lines for signal and power transmission takes place. The connectors for this reason have two connections 69 and 70 for incoming air and outgoing air (supply 54). At least the connection for the incoming air is formed on the mating connector provided on the base machine 2 such that it is automatically closed when the connector 68 is removed. On the connector 68, and the mating connector 67, there are several electrical contacts 71 for the electrical signal lines. Furthermore, on the connector, there are centering pins 72 to which the corresponding centering openings 73 on the mating connector 67 are assigned.

The invention was described above in relation to a preferred embodiment. It goes without saying that numerous modifications and changes are possible without departing from the inventive idea underlying the invention. For example, it is possible for the sensors 27 and/or actuators 28 and/or valves 29 or the tools 26 to be provided, at least partially, on the pertinent workstation 4 and/or to be connected via connections to this workstation or to the electronics 25 there, the coding which has been delivered by the electronics 25 also containing another identification IW which indicates the respective tool 26 assigned to the workstation 4.

Furthermore, it is possible to assign the electronics 30 to the respective lifting means 5, the coding which has then been delivered by these electronics 30 changing according to the tool 26 which is provided on the lifting means 5.

| | Reference number list |
|---|---|
| 1 | automatic production machine |
| 2 | base unit |
| 3 | work position |
| 4 | workstation |
| 5 | lifting means |
| 6 | tool carrier |
| 7 | machine frame |
| 7', 7" | machine frame section |
| 8 | table |
| 9 | column |
| 10 | hollow shaft |
| 11 | table element |
| 11 | peripheral area |
| 12 | drive |
| 13 | motor |
| 14 | table element |
| 15 | receiver |
| 16, 17 | lifting rod |
| 18, 19 | control disk |
| 20, 21 | lever means |
| 22 | sensor |
| 23 | actuator |
| 24 | control valve |
| 25 | electronics |
| 26 | tool |
| 27 | sensor |
| 28 | actuator |
| 29 | control valve |
| 30 | electronics |
| 32 | central control unit |
| 33 | data transmission or data and control bus |
| 34 | subroutine |
| 35 | configuration unit |
| 36–45 | block |
| 46 | control element |
| 47 | actuation element |
| 48, 49 | bus node |
| 50 | electronics |

-continued

Reference number list

| | |
|---|---|
| 50', 50" | inputs |
| 51 | sensor |
| 52 | line |
| 54 | supply |
| 55, 56 | line |
| 57 | electronics |
| 58 | bus coupler |
| 59 | valves |
| 60 | cylinder |
| 61 | block supply |
| 62 | sensors |
| 63 | lines |
| 64 | coding element |
| 65 | control device |
| 66 | protective circuit |
| 67 | multiple mating connector |
| 68 | multiple connector |
| 69, 70 | connections for incoming and outgoing air |
| 71 | electrical contacts |
| 72 | centering pin |
| 73 | centering openinq |
| Figure 4 | |
| 2 | base machine |
| 1. | pneumatics |
| 48 | bus node pneumatics |
| 46 | valves |
| 2. | supply |
| 49 | bus node I/O |
| 50 | I/O |
| 26 | Function unit "A" |
| 44 | cylinder |
| 53 | "unit plugged in" |
| Figure 5 | |
| 2 | Base machine |
| 1. | pneumatics |
| 54 | incoming air, outgoing air |
| 2. | Supply |
| 33 | field bus (optical fiber, copper) |
| 55 | 24 V supply |
| 64 | location coding |
| 56 | 230 V supply |
| 3. | Protection |
| 66 | protective circuit |
| 4 | Function unit "B", "C" |
| 61 | block supply |
| 60 | cylinder |
| 59 | valves |
| 58 | bus coupler (BK) with station coding |
| 62 | sensors |
| 57 | I/O |
| 65 | control devices |

What is claimed is:

1. A workstation for an automatic production and assembly machine which has: a base unit with a transport element which is formed by a rotor which is rotary driven around a vertical machine axis; several receivers which are provided on the transport element, on a periphery of the rotor for components; and a drive for the transport element to move second receivers past work positions in a clocked manner, on which function units can be mounted on the base unit and which are connected by at least one data and control section to a central electronic control means, wherein electrical equipment coding, which identifies each unit is assigned to each of the function units and can be transmitted by the data and control section from the respective function unit to the central electronic control unit, wherein the electrical equipment coding contains an equipment identification which indicates a type of respective function unit.

2. The workstation as claimed in claim 1, wherein the electrical equipment coding is filed in the function unit.

3. The workstation as claimed claim 1, wherein the equipment coding is filed in electronics of the respective function unit.

4. The workstation as claimed in claim 3, wherein the equipment coding is formed by electrical contacts for connection to the data and control section.

5. The workstation as claimed in claim 3, wherein the equipment coding is by programming of a storage element or storage chip of the electronics of the respective function unit.

6. The workstation as claimed in claim 1, wherein the data and control section is formed by a bus system, the bus system is a line bus which has electrical conductors or a fiber optic bus.

7. The workstation as claimed in claim 1, wherein the function units have sensors actuators control elements, or combination thereof.

8. The workstation as claimed in claim 7, wherein the sensors, the actuators, the control elements are connected to the central equipment control means by the data and control section.

9. The workstation as claimed in claim 1, wherein in function units of a second group, each function unit has a bus coupler which is connected to the data and control section for data transmission between the data and control section and electronics which are provided on the function unit of the second group.

10. The workstation as claimed in claim 1, further comprising connectors which are provided on the function units and which when the respective function unit is positioned on a work position interact with a mating connector there for all signal and power transmission between the base unit and the respective function unit.

11. A workstation for an automatic production and assembly machine which has: a base unit with a transport element which is formed by a rotor which is rotary driven around a vertical machine axis; several receivers which are provided on the transport element, on a periphery of the rotor for components; and a drive for the transport element to move second receivers past work positions in a clocked manner, on which function units can be mounted on the base unit and which are connected by at least one data and control section to a central electronic control means, wherein electrical equipment coding, which identifies each unit is assigned to each of the function units and can be transmitted by the data and control section from the respective function unit to the central electronic control unit, wherein the equipment coding contains an identification which indicates a combination of several function units which are present on one work position.

12. A workstation for an automatic production and assembly machine which has: a base unit with a transport element which is formed by a rotor which is rotary driven around a vertical machine axis; several receivers which are provided on the transport element, on a periphery of the rotor for components; and a drive for the transport element to move second receivers past work positions in a clocked manner, on which function units can be mounted on the base unit and which are connected by at least one data and control section to a central electronic control means, wherein electrical equipment coding, which identifies each unit is assigned to each of the function units and can be transmitted by the data and control section from the respective function unit to the central electronic control unit, further comprising means for forming an identification depending on a position of the respective function unit on the base unit.

13. A workstation for an automatic production and assembly machine which has: a base unit with a transport element which is formed by a rotor which is rotary driven around a vertical machine axis; several receivers which are provided on the transport element, on a periphery of the rotor for components; and a drive for the transport element to move second receivers past work positions in a clocked manner, on which function units can be mounted on the base unit and which are connected by at least one data and control section to a central electronic control means, wherein electrical equipment coding, which identifies each unit is assigned to each of the function units and can be transmitted by the data and control section from the respective function unit to the central electronic control unit, wherein in function units of a second group, each function unit has a bus coupler which is connected to the data and control section for data transmission between the data and control section and electronics which are provided on the function unit of the second group, wherein in the electronics of the function units of the second group the equipment identification is filed and wherein the electronics forms a location identification based on a coding which is provided on a respective work position.

14. The workstation as claimed in claim 13, wherein the electronics of the function unit of the second group interacts with sensors or valves for control of final control members for control of electric drives.

15. An automatic production and assembly machine for producing and assembling workpieces, said machine comprising:

a base unit with a rotor which is rotary driven around a vertical machine axis, with a plurality of receivers on a periphery of the rotor for receiving the workpieces during assembling, and with a drive for the rotor to move the plurality of receivers past work positions in a stepwise manner, function units which are mounted on the work positions on the base unit, the function units being work stations and/or tools, central electronic control means, at least one data and control section or bus in between the function units and the central electronic control means, electrical coding means on each function unit providing an electrical coding identifying this unit and at least comprising:

an equipment identification which indicates the type of the respective function unit, and a positioning identification which indicates the position of the respective function unit on the base unit, said electrical coding being transmitted from the respective function unit to the central electronic control means by said at least one data and control section, the central electronic control means comprising, means for storing the actual configuration of the automatic production and assembly machine, which configuration is derived from the electrical coding of all the function units of the machine, and means for comparing this actual configuration with a desired machine configuration.

16. The automatic production and assembly machine, as claimed in claim 15, wherein the equipment coding is filed in the function units.

17. The automatic production and assembly machine, as claimed in claim 15, wherein the equipment coding is electrically formed in electronics of the respective function unit.

18. The automatic production and assembly machine, as claimed in claim 17, wherein the equipment coding is by programming of a storage element or storage chip of the electronics of the respective function unit.

19. The automatic production and assembly machine, as claimed in claim 15, wherein the equipment coding is formed by electrical contact of a multiple connector to the at least one data and control section.

20. The automatic production and assembly machine, as claimed in claim 15, further comprising means for forming an identification depending on a position of the respective function unit on the base unit.

21. The automatic production and assembly machine, as claimed in claim 15, wherein the at least one data and control section is formed by a bus system, the bus system is a line bus which has electrical conductors or a fiber optic bus.

22. The automatic production and assembly machine, as claimed in claim 15, wherein the function units have sensors, actuators, control elements, or combinations thereof.

23. The automatic production and assembly machine, as claimed in claim 22, wherein the sensors, the actuators or the control elements, are connected to a central control means by the at least one data and control section.

24. The automatic production and assembly machine, as claimed in claim 15, wherein the central electronic control means releases a control program which controls the automatic production and assembly machine for triggering the automatic production and assembly machine when the actual configuration and the desired configuration agree.

25. The automatic production and assembly machine, as claimed in claim 15, wherein on the base unit there are first connections for power and data transmission for the function units of a first group and wherein the first connections are joined to valves which are provided on the base unit, and with at least one electronic device which is provided on the base unit.

26. The automatic production and assembly machine, as claimed in claim 25, wherein on the base unit for each function unit of the first group there is a signal terminal which when a function unit is attached delivers a signal to the electronic device or the electronic central control means which indicates a presence of the function unit of the first group on the work base unit.

27. The automatic production and assembly machine, as claimed in claim 26, wherein for the function units of the first group on the base unit there is one common bus node for data transmission between a data and control bus and the function units or electronic device of the first group.

28. The automatic production and assembly machine, as claimed in claim 15, wherein in function units of a second group, each function unit has a bus coupler which is connected to a data and control bus for data transmission between the data and control bus and electronics which is provided on the function unit of the second group.

29. The automatic production and assembly machine, as claimed in claim 28, wherein in the electronics of the function units of the second group, the equipment identification or coding is filed and wherein the electronics forms a location identification or location coding based on a coding which is provided on a respective work position.

30. The automatic production and assembly machine, as claimed in claim 29, wherein the electronic of the function unit of the second group interacts with sensors, with valves for control of final control members, or with control elements for control of electric drives.

31. The automatic production and assembly machine, as claimed in claim 15, further comprising connectors provided on the function units, which when the respective function unit is positioned on the work positions interact with a mating connector for an all signal and power transmission between the base unit and the respective function unit.

32. The automatic production and assembly machine, as claimed in claim 15, wherein several workstations which follow one another in a direction of motion of the transport element and which are formed by function units on the work positions form a production section for a product, and wherein on the transport element there are several production sections for parallel machining.

33. The automatic production and assembly machine claimed in claim 15, wherein the electrical coding further comprises an identification which indicates a combination of function units present on a respective the work position.

* * * * *